United States Patent [15] 3,689,558
Modeen et al. [45] Sept. 5, 1972

[54] POLYMERIZATION INHIBITORS FOR THE CATALYTIC HYDRATION OF ACRYLONITRILE

[72] Inventors: James H. Modeen, Gary E. Newton, both of Midland, Mich. 48640

[73] Assignee: The Dow Chemical Company, Midland, Mich.

[22] Filed: March 9, 1970

[21] Appl. No.: 17,943

[52] U.S. Cl. ............................................. 260/561 N
[51] Int. Cl. ........................................... C07c 103/08
[58] Field of Search .................................. 260/561 N

[56] References Cited

UNITED STATES PATENTS 3,381,034   4/1968   Greene et al. .............. 260/557
3,397,232   8/1968   Takagi et al. ........... 260/561 N
2,559,855   7/1951   Dickey et al. ....... 260/561 N X

FOREIGN PATENTS OR APPLICATIONS 384,058   4/1963   Japan ..................... 260/561 N Primary Examiner—Lewis Gotts
Assistant Examiner—Ethel G. Love
Attorney—Griswold & Burdick, Herbert D. Knudsen and C. E. Rehberg

[57] ABSTRACT

In the catalytic hydration of acrylonitrile to acrylamide, polymer formation is reduced or prevented by maintaining in the acrylonitrile solution a small but effective amount of cupferron, a nitrosophenol or a trialkylamine having alkyl groups of one to six carbon atoms where not more than two alkyl groups are methyl.

7 Claims, No Drawings

POLYMERIZATION INHIBITORS FOR THE CATALYTIC HYDRATION OF ACRYLONITRILE

BACKGROUND OF THE INVENTION

The catalytic hydration of acrylonitrile to acrylamide as described by Habermann and Tefertiller involves contacting an aqueous solution of acrylonitrile with a heterogeneous catalyst at a temperature of about 25° to about 200°C. The heterogeneous catalysts may suitably be copper, copper oxide or the oxides of copper, zinc, cadmium or silver in combination with the oxides of chromium or molybdenum. Preferred catalysts in the process are copper, copper oxide and copper-chromium oxides, especially those obtained by reducing copper oxide or copper-chromium oxide, because they give high conversions, high yields and long catalyst life. When the reduced catalysts are employed, oxygen is preferably removed from the aqueous acrylonitrile feed solution.

In the catalytic hydration of acrylonitrile, the prevention of polymerization of either the nitrile or amide is necessary to minimize the down time and maximize the catalyst life. To accomplish this goal, there has been an intensive search for an inhibitor system that inhibits the polymerization of acrylonitrile and acrylamide during the hydration, but does not interfere with the subsequent polymerization of the finished product.

The most obvious solution to the problem is to add an inhibitor during the hydration and remove the inhibitor prior to the polymerization of the acrylamide product. The additional processing steps required, however, made this method unattractive at best.

Since almost all commercially available acrylonitrile contains the methyl monoether of hydroquinone, this was the logical choice for a suitable inhibitor. When this inhibitor was employed in the preferred hydration, however, polymerization was encountered and the catalytic reactor plugged.

The next logical step was to try known polymerization inhibitors used in normal commercial production, such as cupric ion, ferrous ion and ferrous ammonium complexes. All were indeed tried to no avail.

Having unsuccessfully tried these known inhibitors, a diligent search was initiated to find a practical inhibitor outside of the ranks of known and commercial inhibitors. Such inhibitor must effectively prevent polymerization of acrylonitrile and acrylamide during the catalytic hydration and must allow or promote polymerization of the acrylamide product without expensive processing.

SUMMARY OF THE INVENTION

It has now been found according to the present invention, that cupferron, nitrosophenols and trialkylamines having alkyl groups of one to six carbon atoms where not more than 2 alkyl groups are methyl are effective polymerization inhibitors during the catalytic hydration of acrylonitrile to acrylamide. Moreover, these inhibitors may suitably and readily be deactivated by proper adjustment of the pH so that the desired polymerization of the acrylamide may be conducted without interference from the inhibitor.

For practical purposes, cupferron and the nitrosophenols may be considered together because both give preferred reduction of polymer formation in essentially neutral and acidic monomer solutions, but do not interfere with normal polymerization of acrylamide in basic solutions. The trialkylamines, on the other hand, give preferred reduction of polymer formation in essentially neutral solutions having a pH between 6 and 8, and allow polymerization in both acidic and basic solutions.

Cupferron is phenylnitrosohydroxylamine and is usually sold as the ammonium salt. It can be used as the ammonium salt, another soluble salt or as the free hydroxylamine. Cupferron has very desirable solubility in both aqueous and organic monomer solutions, and it does not substantially interfere with acrylamide polymerization at effective concentrations in alkaline solutions.

Any of the three isomers of nitrosophenol can be used as the inhibitor, with p-nitrosophenol being preferred. The nitrosophenols, however, are less preferred than cupferron or the trialkylamines because of their lower solubility and greater effect on the polymerization.

Any trialkylamine having alkyl groups of one to six carbon atoms where not more than two alkyl groups can be methyl may also be employed as an inhibitor in the hydration. Generally the trialkylamines are symmetrical, but alkylamines wherein the alkyl groups are different may also be employed. Representative examples of trialkylamines include: symmetrical trialkylamines, such as triethylamine, tripropylamine, triisopropylamine, tributylamine, triisohexylamine; and unsymmetrical amines, such as dimethylpropylamine, methyldiethylamine, propyldiethylamine, butyldiisopropylamine and diethylpentylamine. Of the various amine inhibitors, trialkylamines having one to four carbon atoms where only one alkyl group can be methyl are preferred because of their solubility in aqueous solutions, with triethylamine being especially preferred because of its effectiveness.

The concentration of the inhibitor in the solution may vary widely, but for practical purposes, all the inhibitors of the invention are effective in essentially the same concentrations. Any amount effective to reduce polymer formation should be employed. This effective amount may vary as different concentrations of acrylonitrile, temperatures and solvents are employed in the hydration. Generally, at lower acrylonitrile concentrations and lower temperatures, less of the inhibitor is required to give effective protection from undesirable polymerization during the process. In a 3 to 30 percent by weight concentration of acrylonitrile in an aqueous solution at a temperature of about 25° to 150°C., concentrations of about 10 or more p.p.m. by weight based on the acrylonitrile are usually effective, with 15 to 75 p.p.m. being especially preferred because of the effective prevention of polymerization and the efficient use of the inhibitor.

SPECIFIC EMBODIMENTS

Example 1

A neutral 7 percent aqueous solution of acrylonitrile from which oxygen had been removed was passed over a reduced copper chromite catalyst containing 40% Cu and 25.5% Cr sold under the trade name Girdler G-13 at a temperature of 90°C. Without inhibitor or with the methyl ether of hydroquinone substantial amounts of polymer formed on the catalyst and in the reactor. The reactor was cleaned and 25 p.p.m. of cupferron, based on the acrylonitrile, was added to the acrylonitrile feed. With the inhibitor, no polymer formation was observed. The aqueous acrylamide solution obtained was made basic and polymerized according to a conventional technique using a persulfate initiator to give a polymer that was as good as the polymer obtained from monomer produced when no inhibitor was employed.

Example 2

In the same manner as shown in Example 1, 40 p.p.m. of triethylamine was added to an essentially neutral acrylonitrile feed. No polymer was formed in the reactor. Acrylamide containing triethylamine was polymerized at both an acid and a basic solution according to a conventional technique using a persulfate initiator to give polymers which were as good as those polymerizations which used monomers produced without the use of an inhibitor.

In the same manner as shown above, an effective amount of o, p, or m-nitrosophenol may be added at neutral or acidic pH's or tripropylamine, tributylamine, tripentylamine, methyldiethylamine, dimethylpropylamine, and ethyldiisopropylamine may be added at an essentially neutral pH to aqueous solutions of acrylonitrile that are contacted with cupreous or other hydration catalyst to prevent polymerization. The acrylamide monomer containing the nitrosophenols may then be made basic and polymerized according to conventional techniques. The monomer solutions containing the amines may be made either acidic or basic and polymerized to obtain polyacrylamide essentially as good as that prepared from monomer produced without an inhibitor.

We claim:

1. In a process for the catalytic hydration of acrylonitrile to acrylamide by contacting an aqueous solution of acrylonitrile with a heterogeneous catalyst, selected from the group consisting of (1) copper, (2) copper oxide and (3) any combination of (a) at least one oxide of copper, zinc, cadmium or silver and (b) at least one of oxide of chromium or molybdenum, the improvement comprising maintaining a small but effective amount of a polymerization inhibitor which is a trialkylamine having alkyl groups of one to six carbon atoms where not more than two alkyl groups can be methyl, or mixture thereof, in the aqueous solution.

2. The process of claim 1 wherein the concentration of the acrylonitrile solution is 3 to 30 percent by weight, the temperature is 25°–150°C., and the concentration of the inhibitor is greater than 10 p.p.m. by weight based on the acrylonitrile.

3. The process of claim 2 wherein the concentration of the inhibitor is 15 to 75 p.p.m.

4. The process of claim 1 wherein the inhibitor is a trialkylamine having alkyl groups of one to four carbons where not more than one alkyl group is methyl.

5. The process of claim 1 wherein the inhibitor is triethylamine

6. The process of claim 1 wherein the heterogeneous catalyst is copper, copper oxide, copper-chromium oxide or mixture thereof.

7. The process of claim 1 wherein oxygen is removed from the aqueous solution.

* * * * *